United States Patent
Estevez et al.

(10) Patent No.: US 8,917,899 B2
(45) Date of Patent: Dec. 23, 2014

(54) METHODS AND SYSTEMS FOR WATERMARKING DIGITAL MEDIA

(75) Inventors: Leonardo W. Estevez, Rowlett, TX (US); Jennifer H. Webb, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2570 days.

(21) Appl. No.: 11/548,026

(22) Filed: Oct. 10, 2006

(65) Prior Publication Data

US 2008/0085031 A1 Apr. 10, 2008

(51) Int. Cl.
| | |
|---|---|
| G06K 9/00 | (2006.01) |
| H04N 21/254 | (2011.01) |
| G06F 21/10 | (2013.01) |
| H04N 7/16 | (2011.01) |
| H04N 7/167 | (2011.01) |
| H04N 21/44 | (2011.01) |
| H04N 21/4405 | (2011.01) |
| H04N 21/4408 | (2011.01) |
| H04N 21/4627 | (2011.01) |
| H04N 21/4788 | (2011.01) |
| H04N 21/835 | (2011.01) |
| H04N 21/8358 | (2011.01) |
| H04N 19/467 | (2014.01) |

(52) U.S. Cl.
CPC ............ *H04N 21/2541* (2013.01); *G06F 21/10* (2013.01); *H04N 7/163* (2013.01); *H04N 7/1675* (2013.01); *H04N 21/44008* (2013.01); *H04N 21/4405* (2013.01); *H04N 21/4408* (2013.01); *H04N 21/4627* (2013.01); *H04N 21/4788* (2013.01); *H04N 21/835* (2013.01); *H04N 21/8358* (2013.01); *H04N 19/00557* (2013.01)

USPC .......................................... 382/100; 705/26.1

(58) Field of Classification Search
USPC .......... 382/100, 232, 181; 380/210, 252, 287, 380/54; 713/176, 177; 704/200.1, 273; 381/73.1; 370/527, 529; 283/72, 74, 283/75, 77, 93; 705/26.1; 726/26–29
See application file for complete search history.

(56) References Cited

U.S. PATENT DOCUMENTS

| | | | | |
|---|---|---|---|---|
| 6,421,450 | B2 * | 7/2002 | Nakano ......................... | 382/100 |
| 6,442,285 | B2 * | 8/2002 | Rhoads et al. ............... | 382/100 |
| 7,058,196 | B2 * | 6/2006 | Takaragi ...................... | 382/100 |
| 7,257,234 | B2 * | 8/2007 | Kesal et al. .................. | 382/100 |
| 2001/0051996 | A1 * | 12/2001 | Cooper et al. ............... | 709/217 |
| 2002/0078178 | A1 * | 6/2002 | Senoh .......................... | 709/219 |
| 2002/0172395 | A1 * | 11/2002 | Foote et al. .................. | 382/100 |
| 2003/0056103 | A1 * | 3/2003 | Levy et al. ................... | 713/176 |
| 2005/0036652 | A1 * | 2/2005 | Kesal et al. .................. | 382/100 |
| 2005/0069171 | A1 * | 3/2005 | Rhoads et al. ............... | 382/100 |
| 2005/0251683 | A1 * | 11/2005 | Levy et al. ................... | 713/176 |

OTHER PUBLICATIONS

Investigating Machine Identification Code Technology in Color Laser Printers, Electronic Frontier Foundation, Jul. 2005, pp. 1-4, WWW.EFF.org/issues/printers.*

* cited by examiner

*Primary Examiner* — Hadi Akhavannik

(74) *Attorney, Agent, or Firm* — Ronald O. Neerings; Frederick J. Telecky, Jr.

(57) ABSTRACT

A system is provided that includes a processor and a network interface coupled to the processor. The system also includes a system memory coupled to the processor. The system memory stores watermarking instructions that, when executed, cause the processor to mark digital media with information that identifies the system.

20 Claims, 2 Drawing Sheets

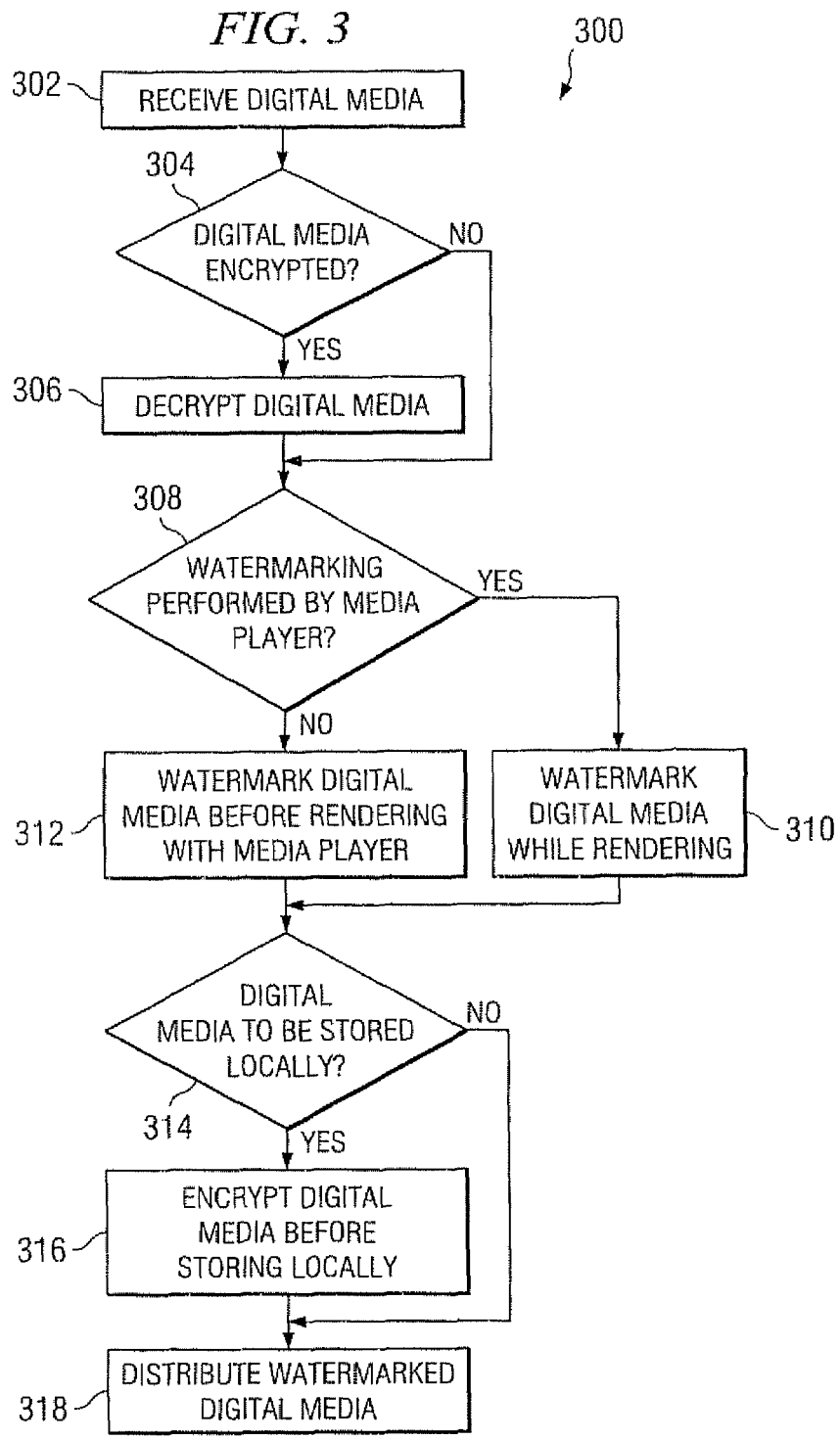

METHODS AND SYSTEMS FOR WATERMARKING DIGITAL MEDIA

BACKGROUND

Digital media such as video, audio or games can be transmitted to a device via a wired or wireless connection. Upon reception of the digital media, the device may display (or "render") the digital media using a media player. If desired, the digital media can be stored on the device for future rendering by the media player.

To discourage unauthorized distribution or rendering of digital media, security mechanisms such as cryptography and "watermarking" have been used. With cryptography, a device is able to render the digital media only after decryption is successful. If the digital media is stored in its encrypted form, distribution of the encrypted digital media is unprofitable without access to the decryption key (i.e., the digital media cannot be rendered). With watermarking, digital media can be marked to identify the source of the digital media. If the watermark is missing, the digital media can be presumed to be unauthorized or otherwise invalid. In such case, a media player can reject a request to render the digital media.

SUMMARY

In at least some embodiments, a system comprises a processor and a network interface coupled to the processor. The system further comprises a system memory coupled to the processor. The system memory stores watermarking instructions that, when executed, cause the processor to mark digital media with information that identifies the system.

In at least some embodiments, a system comprises a plurality of watermarking devices, each watermarking device is configured to receive digital media and mark the digital media with a unique identifier. The system further comprises a tracking device that receives digital media distributed from at least one of the watermarking devices. The tracking device extracts watermark information from the digital media to determine a distribution trajectory of the digital media.

In at least some embodiments, a method comprises receiving digital media by a device. The method further comprises watermarking the digital media with information that identifies the device.

BRIEF DESCRIPTION OF THE DRAWINGS

For a detailed description of exemplary embodiments of the invention, reference will now be made to the accompanying drawings in which:

FIG. 3 illustrates a method in accordance with embodiments of the disclosure;

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Also, the term "watermarking" is intended to mean embedding information in digital media. Digital watermarks are designed to have little or no visibility or audibility when digital media is rendered. Also, the bits representing the watermark can be scattered throughout a digital media file to deter identification and manipulation. Also, digital watermarks can be sufficiently robust to withstand changes to the digital media file.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
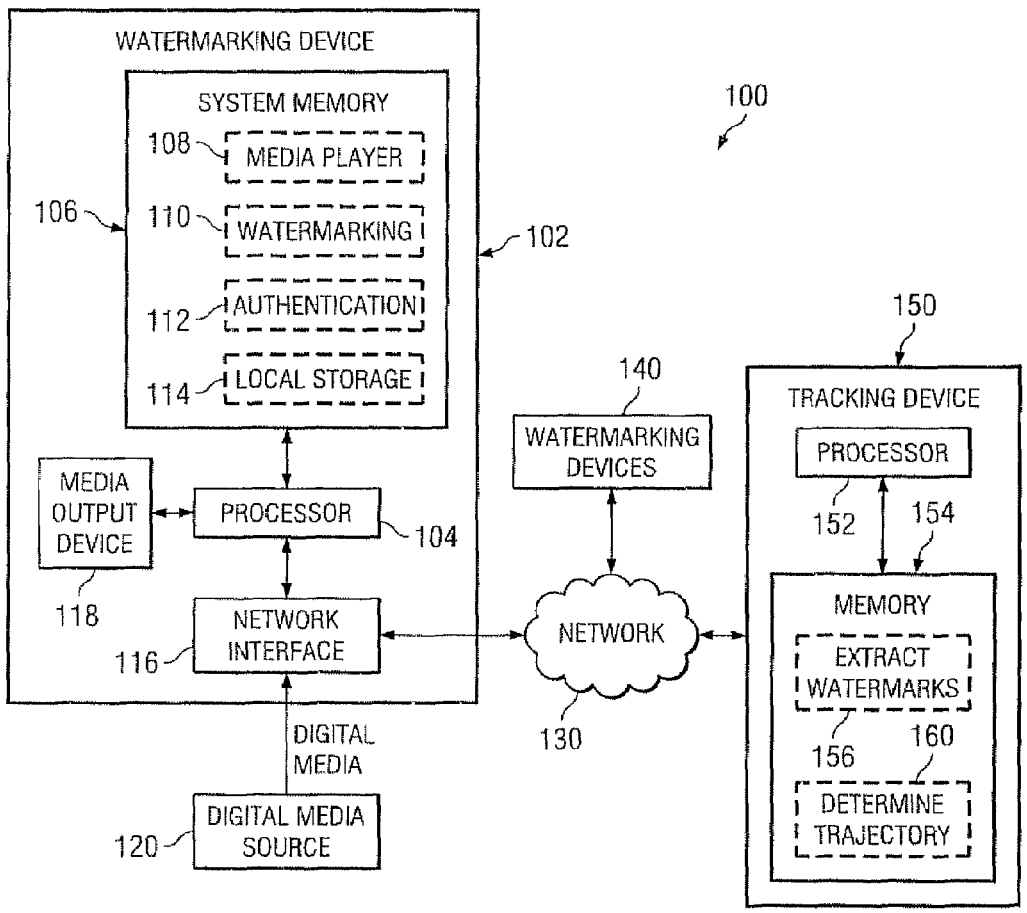
FIG. 1 shows a system in accordance with embodiments of the disclosure.

Embodiments of the inventions enable digital media (e.g., video, audio, games, photos, slide shows) to be watermarked by devices that receive or render the digital media. For example, a device's media player could watermark digital media while rendering the digital media. If the digital media is distributed between multiple devices with watermarking capabilities, each device is able to add its own watermark. During the distribution process, a tracking device networked with the watermarking devices can receive the distributed digital media and extract the watermarks. Based on the watermarks, the tracking device determines the distribution trajectory of the digital media. The watermarks can be used, for example, to discourage unauthorized distribution of digital media or to obtain information regarding how digital media is distributed FIG. 1 shows a system 100 in accordance with embodiments of the disclosure. As shown in FIG. 1, the system 100 comprises a watermarking device 102 coupled to a digital media source 120. The watermarking device 102 may be, for example, a handheld device such as a cellular phone, smart phone, personal digital assistant (PDA) or other handheld device. Additionally or alternatively, the watermarking device 102 may be a laptop computer or desktop computer. The digital media source 120 provides digital media to the watermarking device 102 via a wired or wireless connection. For example, the digital media may be a video stream, an audio stream, a video/audio stream, a video game stream, or other digital media.

In at least some embodiments, the watermarking device 102 comprises a network interface 116 that receives the digital media from the digital media source 120. The network interface 116 may take the form of modems, modem banks, Ethernet cards, Universal Serial Bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, or other network interfaces. In such embodiments, the digital media source 120 could be a server or other device networked with the watermarking device 102. Additionally or alternatively, the digital media source 120 may be a memory storage device such as a CD-ROM, DVD, hard disk, flash memory or other memory storage device. If the digital media source is a memory storage device, the watermarking device 102 receives the digital media through an appropriate input device or input port (e.g., a CD-ROM drive, DVD drive, hard disk connector, or Universal Serial Port (USB)).

As shown in FIG. 1, the watermarking device 102 further comprises a processor 104 coupled to the network interface 116 and to a system memory 106. In at least some embodiments, the system memory 106 stores a media player 108, watermarking instructions 110 and authentication instructions 112 for execution by the processor 104. Also, the system memory 106 may provide local storage 114 for digital media received from the digital media source 120. As shown, the processor 104 also couples to a media output device 118 which may be, for example, a Liquid Crystal Display (LCD) panel, speakers and/or other devices for "rendering" or presenting the digital media.

When executed, the media player 108 renders the digital media on the media output device 118. For example, if the digital media is a video stream, the media player 108 renders a corresponding video on the media output device 118. If the digital media is an audio stream, the media player 108 renders corresponding audio on the media output device 118. If the digital media is a video/audio stream, the media player 108 renders corresponding video and audio on the media output device 118. If the digital media is a video game stream, the media player 108 renders a corresponding video game on the media output device 118. The media player 108 as well as the digital media illustrated in the system 100 could be selected from a variety of commercially available media players and digital media now known or later developed. Also, the media player and digital media are not limited to any particular file type, compression/decompression algorithm, resolution, rendering algorithm or other features relevant to media players and digital media.

When executed, the watermarking instructions 110 cause the processor 104 to mark digital media received from the digital media source 120 with information that identifies the watermarking device 102. For example, the identifying information could be a unique identifier (e.g., a serial number) associated with the watermarking device 102, a network address associated with the watermarking device 102 or other identifying information. The identifying information may also include a time stamp or date stamp (e.g., the time/date at which the watermarking device 102 received the digital media or watermarked the digital media).

Several watermarking techniques could be used to mark the digital media. As an example, a video may have periodic intraframes ("I-frames") to enable random access and to limit error propagation. If there are 1200 macroblocks per I-frame, four 8×8 luminance blocks per macroblock and 255 possible direct current (DC) coefficient values per 8×8 block, then 1219200 (1200×4×254) variations can be made to any I-frame. If DC coefficient values are only modified slightly (e.g., by ±2) to limit visibility of the watermarks, there would still be 19200 (1200×4×4) variations per I-frame. If periodic I-frames are encoded once per second, each hour of video would have 3600 I-frames.

In at least some embodiments, a time stamp could be represented using a 5-bit hour indicator and a 6-bit minute indicator. A date stamp could be represented using a 4-bit month indicator, a 5-bit day indicator and a 7-bit year indicator (0-99) or 4-bit year indicator (0-9). A network address (e.g., an internet protocol (IP) address) could be represented using 32 bits. A device identifier could be represented using 32 bits. In some embodiments, 2 bits of a network address could be added to each of 16 DC coefficient values (i.e., 4 macroblocks are altered). If desired, a hashing function could map the time stamp and/or the date stamp to a particular group of four macroblocks. The date modulo (365 days×3 years) could map to a particular I-frame in the first 20 minutes of video data. Also, 8 bits of the time stamp could directly or randomly map to a group of four macroblocks within a 640×480 pixel video graphics array (VGA) frame which contains 300 such groups. If the watermarking mapping function is invertible, the time stamp, date stamp, network address, or device identifier could be extracted by comparing the watermarked digital media with the original digital media.

For a standard such as H.263, DC coefficients of intra-coded macroblocks are fixed-length coded with 8 bits. For a standard such as MPEG-4 without short headers, the value of DC coefficients is variable. In either case, bits of data can be encoded by altering the DC coefficients. If necessary, a different size codeword could be used. In such case, the byte alignment or header information regarding a coded frame size can be adjusted accordingly. In at least some embodiments, the byte alignment can be corrected by adjusting the bit stuffing used to align start codes. As needed, extra bits (4 bytes or 8 bytes) could be inserted per renderer for the network address or device identifier. In summary, for some embodiments, watermarking videos may be accomplished by adjusting DO or AC coefficients. Alternative or similar watermarking techniques could be used for audio, video games, photos or slide shows.

In at least some embodiments, adding a watermark requires a full transcoding of the bitstream. Alternatively, a simplified (low complexity) watermarking technique can be implemented by modifying fixed-length codewords that do not alter the processing flow of the decoder. Also, variable-length codewords may be modified. If the length of a codeword is altered, the byte alignment of certain start codes and the overall bit rate are maintained. To reduce the visibility of a watermark, some embodiments perform watermarking with only minor changes being made to any single codeword.

In at least some embodiments, the watermarking process is performed while the digital media is being rendered by the media player 108. In other words, the watermarking instructions 110 may be part of the media player 108 or may be called by the media player 108. Additionally or alternatively, the watermarking process occurs while the digital media is downloaded to the local storage 114. Thus, the digital media may be pre-buffered before being rendered by the media player 108. In such case, instructions involved with transferring the digital media to the local storage 114 (e.g., a real-time protocol (RTP) stack) may perform the watermarking. In some embodiments, the watermarking takes place within a storage device (e.g., within a removable memory card) as the media is being stored. Also, any watermarking technique utilized on compressed media could be applicable as long as multiple watermarks do not overwrite each other. To prevent overwriting watermarks, the location in which watermarks are written can be randomized.

Once the watermarking is complete, the digital media may be distributed to other watermarking devices 140 via a network 130. The distribution of the watermarked digital media may be via wired or wireless transmission. Additionally or alternatively, the digital media can be transferred from one device to another using removable storage devices (e.g., CD-ROM, DVD_ROM, hard disk, or flash memory). In either case, a user of the watermarking device 102 may choose (with or without proper authorization) to distribute the watermarked digital media to one or more of the other watermarking devices 140. In at least some embodiments, each watermarking device that receives the digital media is able to add another watermark to the digital media. In other words, each of the other watermarking devices 140 comprises the same or similar watermarking functionality as described for the watermarking device 102. As previously mentioned, each watermark may provide identifying information such as a device identifier, a network address, a time stamp or a date stamp. In some embodiments, the watermarked digital media from the watermarking device 102 is distributed to non-watermarking devices only or to both watermarking devices and non-watermarking devices. In other words, not necessarily every device that receives the watermarked digital media adds another watermark.

As shown in FIG. 1, the system 100 may also comprise a tracking device 150 coupled to the network 130. The tracking device 150 is able to receive a watermarked digital media that is being distributed on the network 130. The watermarked digital media may be watermarked once or many times depending on the watermarking capabilities of devices on the network 130 and the number of devices that receive and distribute the digital media before the tracking device 150 receives the digital media.

In at least some embodiments, the tracking device 150 comprises a processor 152 and a memory 154 which stores extract watermarks instructions 156 and determine trajectory instructions 160. When executed, the extract watermarks instructions 156 cause the processor 152 to extract information (e.g., device identifiers, network addresses, time stamps or date stamps) from the watermarked digital media. In some embodiments, the watermarks are extracted by comparing the watermarked digital media with the original digital media from the digital media source 120A.

When executed, the determine trajectory instructions 160 cause the processor 152 to determine the trajectory or path taken by the watermarked digital media. The trajectory may be based on device identifiers, network addresses, time stamps, date stamps or other information gleaned from the watermarks. Although the watermarks do not directly prevent unauthorized distribution of digital media, the watermarks can be used to prove a device received the digital media and distributed the digital media. In some embodiments, a media player can refuse to render digital media that is watermarked more than a threshold number of times. Also, the watermarks can indicate how digital media is being distributed between devices. Such information can potentially be useful in marketing (advertising) applications where marketers desire to contact users through the same trajectories indicated by the watermarked digital media.

As shown in FIG. 1, the system memory 106 also comprises the authentication instructions 112. In at least some embodiments, the authentication instructions 112 cause the processor 104 to authenticate a user and/or to decrypt the digital media before the media player 108 can render the digital media. The authentication instructions 112 also may cause the processor 104 to authenticate a user and/or to decrypt the digital media before the digital media can be stored in the local storage 114. After the digital media has been watermarked, the authentication instructions 112 also may cause to processor 104 to encrypt the watermarked digital media. Based on the encryption, the watermarked digital media cannot be rendered without an appropriate "rights object" or decryption key. Thus, even if the encrypted watermarked digital media is stored in the local storage 114 or is transferred to another device, the encrypted watermarked digital media cannot be rendered by a media player (e.g., the media player 108) without the correct rights object or decryption key.

Figure 2:
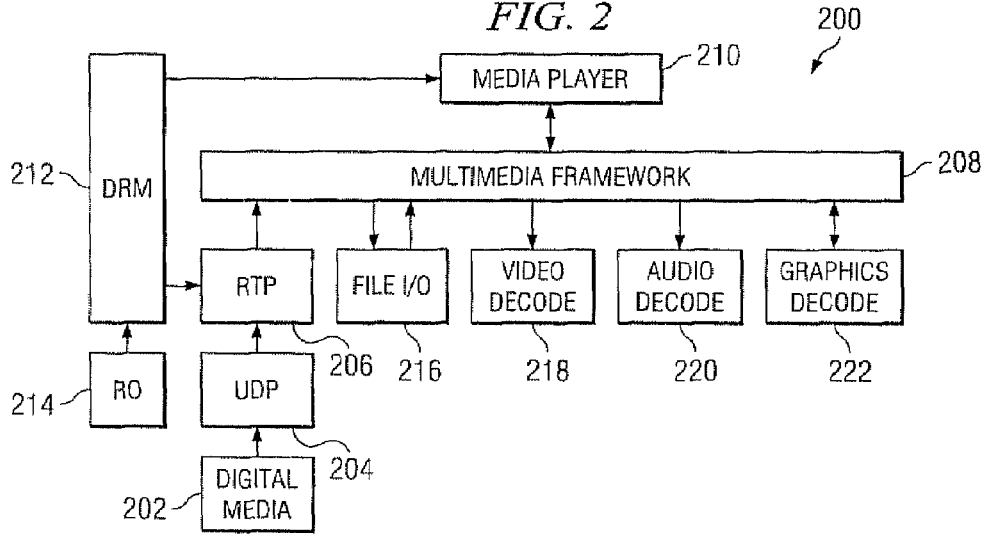
FIG. 2 shows a device in accordance with embodiments of the disclosure.

FIG. 2 shows a device 200 in accordance with embodiments of the disclosure. As shown in FIG. 2, the device 200 comprises a digital rights management (DRM) module 212 coupled to a media player 210 and a real-time transport protocol (RTP) stack 206. In at least some embodiments, a multimedia framework 208 interfaces the RTP stack 206 with the media player 210. The multimedia framework 208 also couples to a file input/output (I/O) module 216, a video decode module 218, an audio decode module 220 and a graphics decode module 222A. The file I/O module 216 enables multimedia files to be loaded from and stored to a local storage. The video decode module 218 enables video files to be decoded for use by the media player 210. The audio decode module 212 enables audio files to be decoded for use by the media player 210. The graphics decode module 222 enables graphics files (e.g., video games, photos, or slide shows) to be decoded for use by the media player 210.

In at least some embodiments, digital media 202 is received by the device 200 via a User Datagram Protocol (UDP) stack 204. The UDP stack 204 provides fast delivery of data without handshaking, flow control or reliability mechanisms. Other protocols could alternatively be used. After reception by the UDP stack 204, the digital media is forwarded to the RTP stack 206. In at least some embodiments, the RTP stack 206 provides network transport functions suitable for applications transmitting digital media over multicast or unicast network services. The RTP stack 206 can also be augmented by a control protocol (such as the real-time transport control protocol (RTCP)) to monitor data delivery and network statistics. Together the RTP stack 206 and RTCP resolve problems such as lost packets, jitter, out of sequence packets or other problems a UDP network environment may experience.

In at least some embodiments, the RTP stack 206 watermarks the digital media 202 received by the UDP stack 204. Before watermarking the digital media 202, a user authentication and/or data decryption may be performed based on a "rights object" 214 provided to the DRM module 212. The rights object 214 may, for example, enable the RTP stack 206 to authenticate a user or to decrypt the digital media 202. Once user authentication or data decryption is complete, the RTP stack 206 watermarks the digital media 202 and forwards the digital media to the multimedia framework 208. In at least some embodiments, the RTP stack 206 re-encrypts the watermarked digital media before forwarding the watermarked digital media to the multimedia framework 208. From the multimedia framework 208, the watermarked digital media can be stored/retrieved via the file I/O module 216. Also, the watermarked digital media can be decoded using the video decode module 218, the audio decode module 220 or the graphics decode module 222. Also, the watermarked digital media can be rendered by the media player 210.

In alternative embodiments, the media player 210 (rather than the RTP stack 206) watermarks the digital media 202. For example, the media player 210 could perform the watermarking while rendering the digital media 202. Before watermarking the digital media 202, a user authentication and/or data decryption may be performed based on a "rights object" 214 provided to the DRM module 212. The rights object 214 may, for example, enable the RTP stack 206 to authenticate a user or to decrypt the digital media 202. Once user authentication or data decryption is complete, the RTP stack 206 forwards the digital media to the multimedia framework 208. From the multimedia framework 208, the digital media can be stored/retrieved via the file I/O module 216. Also, the digital media can be rendered by the media player 210 based on decoding performed by the video decode module 218, the audio decode module 220 or the graphics decode module 222.

While rendering the digital media 202, the media player 210 can watermark the digital media. The watermarked digital media can then be stored/retrieved via the file I/O module 216. In some embodiments, the watermarked digital media replaces the digital media previously stored/retrieved via the file I/O module 216. By watermarking the digital media 202 with information that identifies the device 200 (e.g., a device identifier, a network address, a time stamp or a date stamp), a tracking process can be performed as previously described.

In some embodiments, an original digital media file is only replaced if the media player 210 renders the entire file. For example, the media player 210 can begin to write a watermarked version of a digital media file while rendering the digital media. If the entire digital media file is rendered, the original digital media file can be deleted and the watermarked digital media file is renamed to the original file name. This mechanism can be used to "lock" or limit distribution of digital media. For example, if a media player determines that a digital media file has more than a threshold number of watermarks (i.e., the digital media file has been distributed or rendered more than a threshold amount of times), the media player can refuse to render the digital media file.

FIG. 3 illustrates a method 300 in accordance with embodiments of the disclosure. As shown in FIG. 3, the method 300 comprises receiving digital media (block 302). If the digital media is encrypted (determination block 304), decryption of the digital media is performed (block 306). If watermarking is performed by a media player (determination block 308), the media player watermarks the digital media while rendering the digital media (block 310). If watermarking is not performed by a media player (determination block 308), the digital media is watermarked before rendering by the media player (block 312). For example, in some embodiments, the digital media is watermarked by an RTP stack before the media player renders the digital media. If the digital media is to be stored locally (determination block 314), the digital media can be encrypted before local storage (block 316). In alternatively embodiments, encryption of the watermarked digital media is not performed. If the digital media is not to be stored locally (determination block 314), the watermarked digital media can be distributed (block 318). Even if the digital media is stored locally (encrypted or not), the digital media can later be distributed (block 318).

By watermarking the digital media with information (e.g., a device identifier, a network address, a time stamp or a date stamp) that identifies a device that receives and/or renders the digital media, a tracking process can be performed to determine a distribution trajectory of the digital media. The distribution trajectory can be used to track unauthorized distribution of the digital media. Additionally or alternatively, the distribution trajectory can be used as a marketing analysis tool which determines how digital media is distributed.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer system, comprising:
   a processor;
   a communication interface coupled to the processor, wherein digital media is received via the communication interface; and
   a system memory coupled to the processor, wherein the system memory stores watermarking instructions that, when executed, cause the processor to mark the received digital media with information that identifies the computer system as having rendered the digital media.

2. The system of claim 1 wherein the system memory stores a media player and wherein the watermarking instructions cause the processor to mark the digital media while the media player renders the digital media.

3. The system of claim 2 wherein the system memory further comprises authentication instructions that, when executed, cause the processor to authenticate a rights object associated with the digital media before the media player renders the digital media.

4. The system of claim 1 wherein the system memory further comprises authentication instructions that, when executed, cause the processor to authenticate a rights object associated with the digital media before the digital media is stored as a local file in the system memory.

5. The system of claim 1 wherein the system memory further comprises authentication instructions that, when executed, cause the processor to decrypt the digital media before the digital media is stored as a local file in the system memory.

6. The system of claim 1 wherein the system memory further comprises authentication instructions that, when executed, cause the processor to decrypt the digital media as the media player renders the digital media.

7. The system of claim 1 wherein the watermarking instructions mark the digital media before the digital media is stored as a local file in the system memory.

8. The system of claim 1 wherein the watermarking instructions, when executed, cause the processor to mark the digital media based on direct current (DC) coefficients.

9. The system of claim 8 wherein the watermarking instructions, when executed, cause the processor to randomly mark intraframes (I-frames) of the digital media based on DC coefficients.

10. A system, comprising:
    a plurality of watermarking devices, each watermarking device is configured to receive digital media and mark the digital media with a unique identifier;
    a tracking device that receives digital media distributed among the watermarking devices, wherein the tracking device extracts watermark information from the digital media to determine a distribution trajectory of the digital media among the watermarking devices.

11. The system of claim 10 wherein at least one of the watermarking devices has a media player that renders digital media and wherein the media player performs watermarking while rendering the digital media.

12. The system of claim 10 wherein at least one of the watermarking devices comprises a real-time protocol (RTP) stack and a media player, wherein the RTP stack performs watermarking before the media player renders digital media.

13. The system of claim 10 wherein at least one of the watermarking devices comprises a real-time protocol (RTP) stack and a local memory, wherein the RTP stack performs watermarking before digital media is stored in the local memory.

14. The system of claim 10 wherein at least one of the watermarking devices randomly marks digital media intraframes (I-frames) based on DC coefficients.

15. A method, comprising:
receiving digital media by a device;
watermarking the digital media with information that identifies the device as having stored the digital media.

16. The method of claim 15 further comprising rendering the digital media while watermarking the digital media.

17. The method of claim 15 further comprising decrypting the digital media before watermarking the digital media.

18. The method of claim 17 further comprising encrypting the digital media after watermarking the digital media.

19. The method of claim 15 further comprising locally storing the digital media after watermarking the digital media.

20. The method of claim 15 further comprising,
watermarking the digital media with information that identifies each device that receives the digital media; and
determining a distribution trajectory of the digital media based on the watermarks.

* * * * *